United States Patent

Martin (10) Patent No.: US 10,349,334 B2
(45) Date of Patent: Jul. 9, 2019

(54) TERMINAL DEVICE, METHOD AND SYSTEM FOR COORDINATING RELAY NODE ACCESS IN A WIRELESS TELECOMMUNICATIONS SYSTEM

(71) Applicant: SONY CORPORATION, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/728,547

(22) Filed: Oct. 10, 2017

(65) Prior Publication Data

US 2018/0063768 A1    Mar. 1, 2018

Related U.S. Application Data

(63) Continuation of application No. PCT/EP2016/067172, filed on Jul. 19, 2016.

(30) Foreign Application Priority Data

Sep. 23, 2015  (EP) ..................................... 15186530

(51) Int. Cl.
| | |
|---|---|
| *H04W 40/22* | (2009.01) |
| *H04W 36/30* | (2009.01) |
| *H04W 88/04* | (2009.01) |
| *H04B 17/318* | (2015.01) |
| *H04W 8/00* | (2009.01) |

(52) U.S. Cl.
CPC ........... *H04W 40/22* (2013.01); *H04W 36/30* (2013.01); *H04B 17/318* (2015.01); *H04W 8/005* (2013.01); *H04W 88/04* (2013.01)

(58) Field of Classification Search
None
See application file for complete search history.

(56) References Cited

U.S. PATENT DOCUMENTS

2010/0167743 A1    7/2010  Palanki et al.
2014/0135019 A1    5/2014  Jang et al.
(Continued)

FOREIGN PATENT DOCUMENTS

| RU | 2523437 C2 | 2/2014 |
|---|---|---|
| WO | WO 2016/184618 A1 | 11/2016 |

OTHER PUBLICATIONS

Alcatel-Lucent Shanghai Bell, Alcatel-Lucent D2D system design enhancement to support out-of-coverage and partial coverage discovery for UE-network relays, Apr. 20-24, 2015, R1-151328, 4 pages.

(Continued)

*Primary Examiner* — Diane L Lo
(74) *Attorney, Agent, or Firm* — Xsensus, LLP (57) ABSTRACT

A terminal device for use with a wireless telecommunications system comprising a base station and a plurality of relay nodes, the terminal device comprising: a transmitter; a receiver; and a controller operable to: select a first relay node from the plurality of relay nodes and control the transmitter and receiver to exchange signals with the base station via the first relay node; measure a signal characteristic associated with the first relay node and compare the measured signal characteristic with a predetermined threshold value; if the measured signal characteristic is greater than the predetermined threshold value, control the transmitter and receiver to continue to exchange signals with the base station via the first relay node; and if the measured signal characteristic is less than the predetermined threshold value, perform a procedure for allowing selection of a second relay node from the plurality of relay nodes via which the transmitter and receiver may exchange signals with the base station.

15 Claims, 7 Drawing Sheets

(56) References Cited

U.S. PATENT DOCUMENTS

| | | | | |
|---|---|---|---|---|
| 2015/0350859 A1* | 12/2015 | Hiben | ................... | H04W 60/04 |
| | | | | 455/404.1 |
| 2016/0286471 A1* | 9/2016 | Zisimopoulos | ....... | H04W 48/16 |
| 2016/0337954 A1* | 11/2016 | Gulati | ................... | H04W 76/14 |
| 2017/0086114 A1* | 3/2017 | Jung | ..................... | H04W 36/08 |
| 2018/0123682 A1* | 5/2018 | Jung | ..................... | H04W 40/12 |
| 2018/0132161 A1* | 5/2018 | Lee | ......................... | H04W 4/00 |
| 2018/0139682 A1* | 5/2018 | Xu | ........................ | H04W 88/04 |
| 2018/0176805 A1* | 6/2018 | Lee | ....................... | H04W 24/08 |

OTHER PUBLICATIONS

LG Electronics "solution on ProSe Relay Selection and Re-selection" Nov. 11-15, 2013, S2-134143, San Francisco, USA 6 pages.

LTE for UMTS; OFDMA and SC-FDMA Based Radio Access, Holma and Toskala, Wiley 2009, ISBN 978-0-470-99401-6, System Architecture Based on 3GPP SAE 4 pages.

International Search Report issued in International Application No. PCT/EP2016/067172, International Filing Dated Jul. 19, 2016, 4 pages.

3GPP TR 36.872 v12.1.0 (Dec. 2013) $3^{rd}$ Generation Partnership Project; Technical Specification Group adio Access Network; Small cell enhancements for E-UTRA and E-UTRAN—Physical layer aspects (release 12) 100 pages.

Russian Office Action issued in Russian Application 2018114682/07, dated Jan. 25, 2019, 7 pages.

InterDigital Communications "On Relay Selection/Reselection for UE-to-Network Relays", 3GPP TSG-RAN WG2#90 (Tdoc R2-152680), Fukuoka, Japan, May 25-29, 2015, 4 pages.

\* cited by examiner

TERMINAL DEVICE, METHOD AND SYSTEM FOR COORDINATING RELAY NODE ACCESS IN A WIRELESS TELECOMMUNICATIONS SYSTEM

CROSS-REFERENCE TO RELATED APPLICATIONS

This application is a continuation of International Application No. PCT/EP2016/067172, filed Jul. 19, 2016, which is based upon and claims priority to European Application No. 15186530.0, filed Sep. 23, 2015, the entire contents of which are incorporated herein by reference.

TECHNICAL FIELD OF THE DISCLOSURE

The present disclosure relates to a terminal device, method and system.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications terminal such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications terminals, or when communications between communications terminals are required but the communications terminals may not be within the coverage area of a network. In order to address these limitations, in LTE releases-12 and -13, the ability for LTE communications terminals to perform device-to-device (D2D) communications has been introduced and developed.

D2D communications allow communications terminals that are in close proximity to communicate directly with each other, both when within and when outside of a coverage area or when the network fails. This D2D communications ability can allow user data to be more efficiently communicated between communications terminals by obviating the need for user data to be relayed by a network entity such as a base station, and also allows communications terminals that are in close proximity to communicate with one another although they may not be within the coverage area of a network.

D2D communications may also allow a first communications terminal to communicate with a base station via a second communications terminal (so that the second communications terminal acts as a relay node). This allows coverage extension when the first communications terminal is out of coverage of the base station, for example. Alternatively, the first communications terminal may be within coverage of the base station, but may nonetheless communicate with the base station via the second communications terminal. In this case, the second communications terminal can be granted the right to manage the first communications terminal (including control of mobility, resource allocation, etc.), and thus provides a means for the network capacity to be increased.

A problem with the use of such relay nodes, however, is that there are several mobility scenarios to handle. For example, in addition to an initial selection of a particular relay node for an out-of-coverage communications terminal, there needs to be a way to select and connect to a relay node when a communications terminal moves from being in coverage to being out of coverage (this requiring the connection to be moved from a base station to a relay node), as well as when a communications terminal moves from the coverage of one relay node to that of another relay node (requiring the connection to be moved from the initial relay node to the new relay node). Furthermore, for the scenario in which a communications terminal is within coverage of a base station but nonetheless communicates with the base station via a relay node, there needs to be a way to manage mobility so that a communications device communicating with the base station via one relay node may select another relay node or a communications device communicating directly with the base station may select a relay node.

SUMMARY OF THE DISCLOSURE

In a first aspect, the present technique provides a terminal device for use with a wireless telecommunications system comprising a base station and a plurality of relay nodes, the terminal device comprising: a transmitter; a receiver; and a controller operable to: select a first relay node from the plurality of relay nodes and control the transmitter and receiver to exchange signals with the base station via the first relay node; measure a signal characteristic associated with the first relay node and compare the measured signal characteristic with a predetermined threshold value; if the measured signal characteristic is greater than the predetermined threshold value, control the transmitter and receiver to continue to exchange signals with the base station via the first relay node; and if the measured signal characteristic is less than the predetermined threshold value, perform a procedure for allowing selection of a second relay node from the plurality of relay nodes via which the transmitter and receiver may exchange signals with the base station.

In an embodiment, the procedure for allowing selection of a second relay node from the plurality of relay nodes comprises performing measurements of a characteristic of a discovery signal transmitted by each relay node in the plurality of relay nodes and received at the receiver.

In an embodiment, the discovery signal is transmitted periodically by each relay node in the plurality of relay nodes.

In an embodiment, when the measured signal characteristic associated with the first relay node is determined to be less than the predetermined threshold value, the controller is operable to control the transmitter to transmit a discovery signal initiation message to each of the relay nodes in the plurality of relay nodes, the discovery signal initiation message instructing each relay node in the plurality of relay nodes to transmit the discovery signal.

In an embodiment, on the basis of the performed measurements, the controller is operable to select a second relay node and to control the transmitter and receiver to exchange signals with the base station via the selected second relay node.

In an embodiment, the predetermined threshold value is greater than a suitable threshold value, the suitable threshold value being a value of the signal characteristic associated with the first relay node below which the controller determines that at least one of the transmitter and receiver cannot exchange signals with the first relay node.

In an embodiment, the predetermined threshold value is greater than the suitable threshold value by a predetermined amount.

In an embodiment, the receiver is operable to receive the predetermined amount by which the predetermined threshold value is greater than the suitable threshold value from one of the base station or first relay node.

In an embodiment, the receiver is operable to receive the predetermined threshold value from one of the base station or first relay node.

In an embodiment, the measured signal characteristic associated with the first relay node is a ProSe Communication 5 (PC5) Device-to-Device (D2D) Reference Signal Received Power (RSRP).

In an embodiment, the measured signal characteristic of the discovery signal transmitted by each relay node in the plurality of relay nodes is a ProSe Communication 5 (PC5) Device-to-Device (D2D) Reference Signal Received Power (RSRP).

In a second aspect, the present technique provides a wireless telecommunications system comprising a base station, a plurality of relay nodes, and a terminal device according to the first aspect.

In a third aspect, the present technique provides a method of operating a terminal device for use with a wireless telecommunications system comprising a base station and a plurality of relay nodes, the terminal device comprising a transmitter and a receiver, the method comprising: selecting a first relay node from the plurality of relay nodes and controlling the transmitter and receiver to exchange signals with the base station via the first relay node; measuring a signal characteristic associated with the first relay node and comparing the measured signal characteristic with a predetermined threshold value; if the measured signal characteristic is greater than the predetermined threshold value, controlling the transmitter and receiver to continue to exchange signals with the base station via the first relay node; and if the measured signal characteristic is less than the predetermined threshold value, performing a procedure for allowing selection of a second relay node from the plurality of relay nodes via which the transmitter and receiver may exchange signals with the base station.

In a fourth aspect, the present technique provides a storage medium storing a computer program for controlling a computer to perform a method according to the third aspect.

In a fifth aspect, the present technique provides a terminal device for use with a wireless telecommunications system comprising a base station and a plurality of relay nodes, the terminal device comprising: transmitter circuitry; receiver circuitry; and controller circuitry operable to: select a first relay node from the plurality of relay nodes and control the transmitter circuitry and receiver circuitry to exchange signals with the base station via the first relay node; measure a signal characteristic associated with the first relay node and compare the measured signal characteristic with a predetermined threshold value; if the measured signal characteristic is greater than the predetermined threshold value, control the transmitter circuitry and receiver circuitry to continue to exchange signals with the base station via the first relay node; and if the measured signal characteristic is less than the predetermined threshold value, perform a procedure for allowing selection of a second relay node from the plurality of relay nodes via which the transmitter circuitry and receiver circuitry may exchange signals with the base station.

Various further aspects and features of the present technique are defined in the appended claims, which includes a method of controlling communications in a mobile communications system, a first communications terminal forming part of a mobile communications system, a method of operating a first communications terminal forming part of a mobile communications system, a second communications terminal forming part of a mobile communications system, a method of operating a second communications terminal forming part of a mobile communications system, and circuitry for a mobile communications system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Device-to-Device Communications

Figure 1:
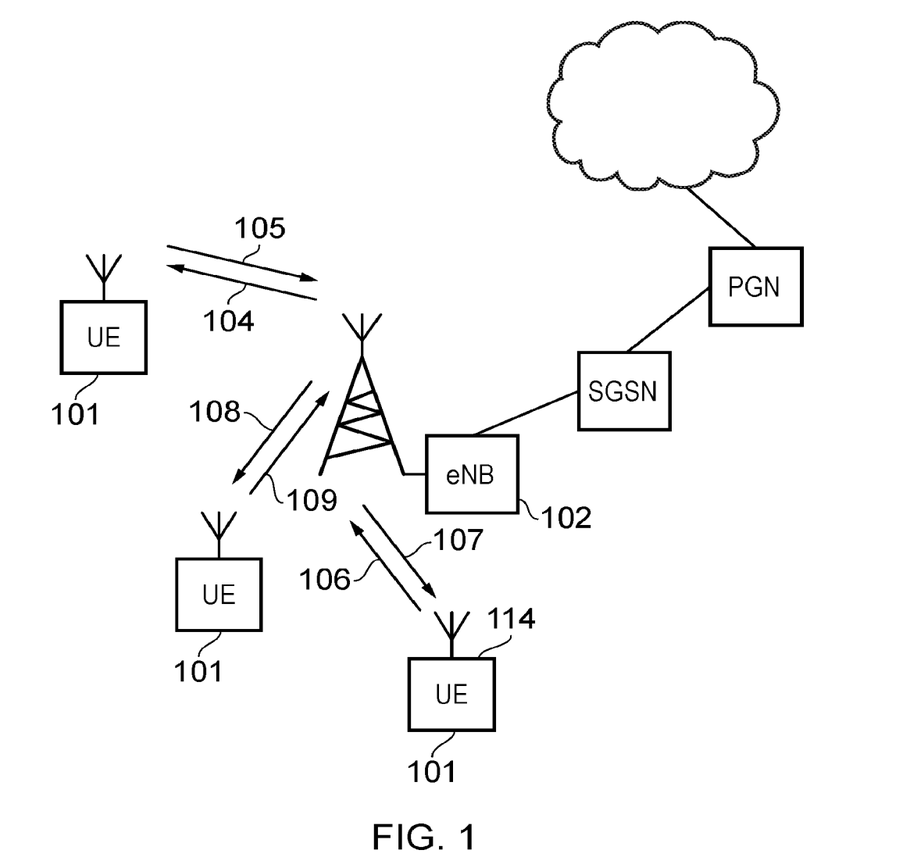
FIG. 1 provides a schematic diagram of a mobile communications system.

FIG. 1 provides a schematic diagram of a conventional mobile telecommunications system 100, where the system includes mobile communications terminals 101, infrastructure equipment 102 and a core network 103. The infrastructure equipment may also be referred to as a base station, network element, enhanced Node B (eNodeB or eNB) or a coordinating entity for example, and provides a wireless access interface to the one or more communications terminals within a coverage area or cell. The one or more mobile communications terminals may communicate data via the transmission and reception of signals representing data using the wireless access interface. The network entity 102 is communicatively linked to core network components such as a serving gateway support node 103 a packet data gateway 103.1 and an external network 103.2, which may be connected to one or more other communications systems or networks which have a similar structure to that formed from communications terminals 101 and infrastructure equipment 102. The core network may also provide functionality including authentication, mobility management, charging and so on for the communications terminals served by the network entity. The mobile communications terminals of FIG. 1 may also be referred to as communications terminals, user equipment (UE), terminal devices and so forth, and are configured to communicate with one or more other communications terminals served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications terminals and 105, 107 and 109 represent the uplink communications from the communications terminals to the network entity. The communications system 100 may operate in accordance with any known protocol, for instance in some examples the system 100 may operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Figure 2:
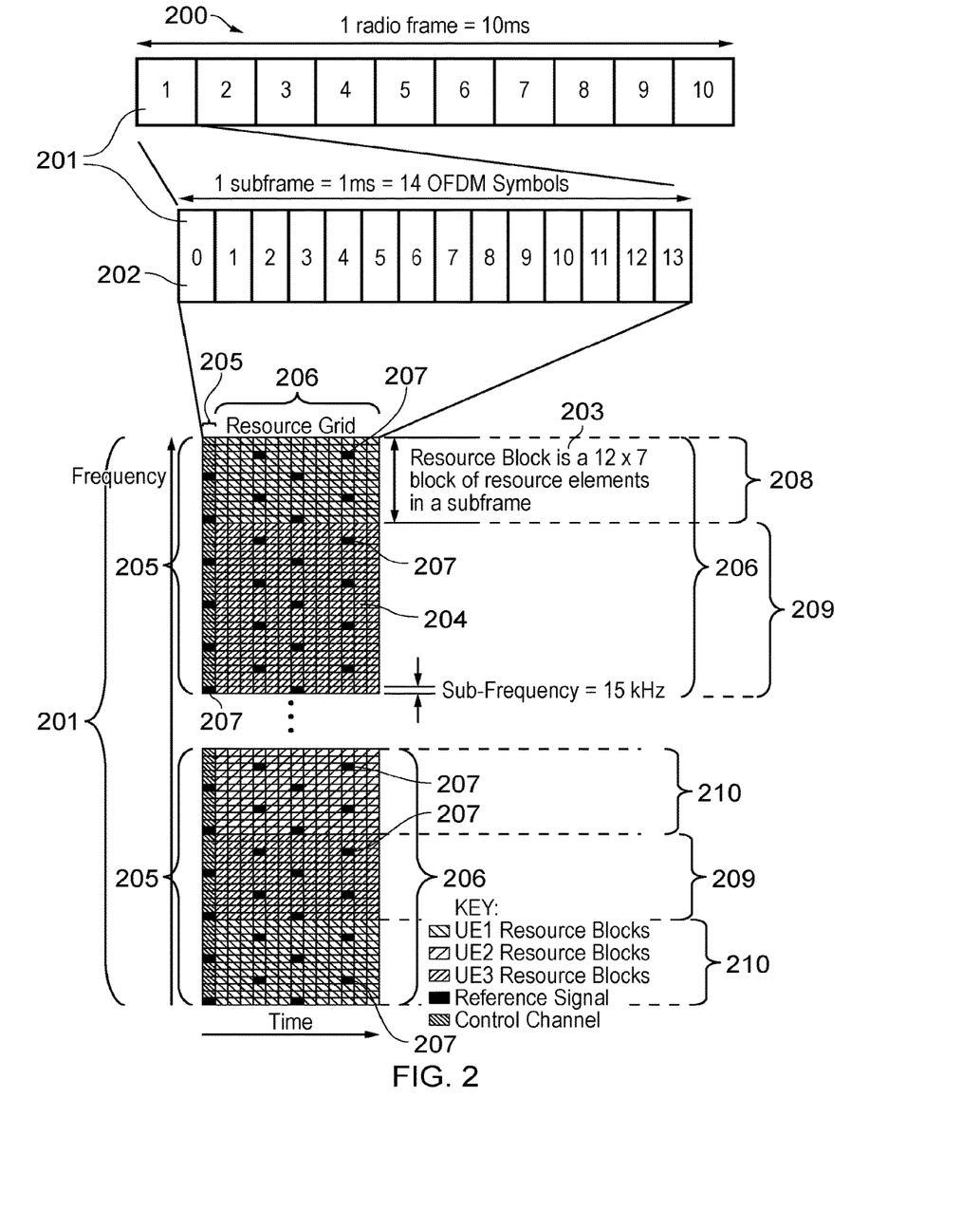
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [2].

Resources within the PDSCH may be allocated by an eNodeB to communications terminals (UEs) being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
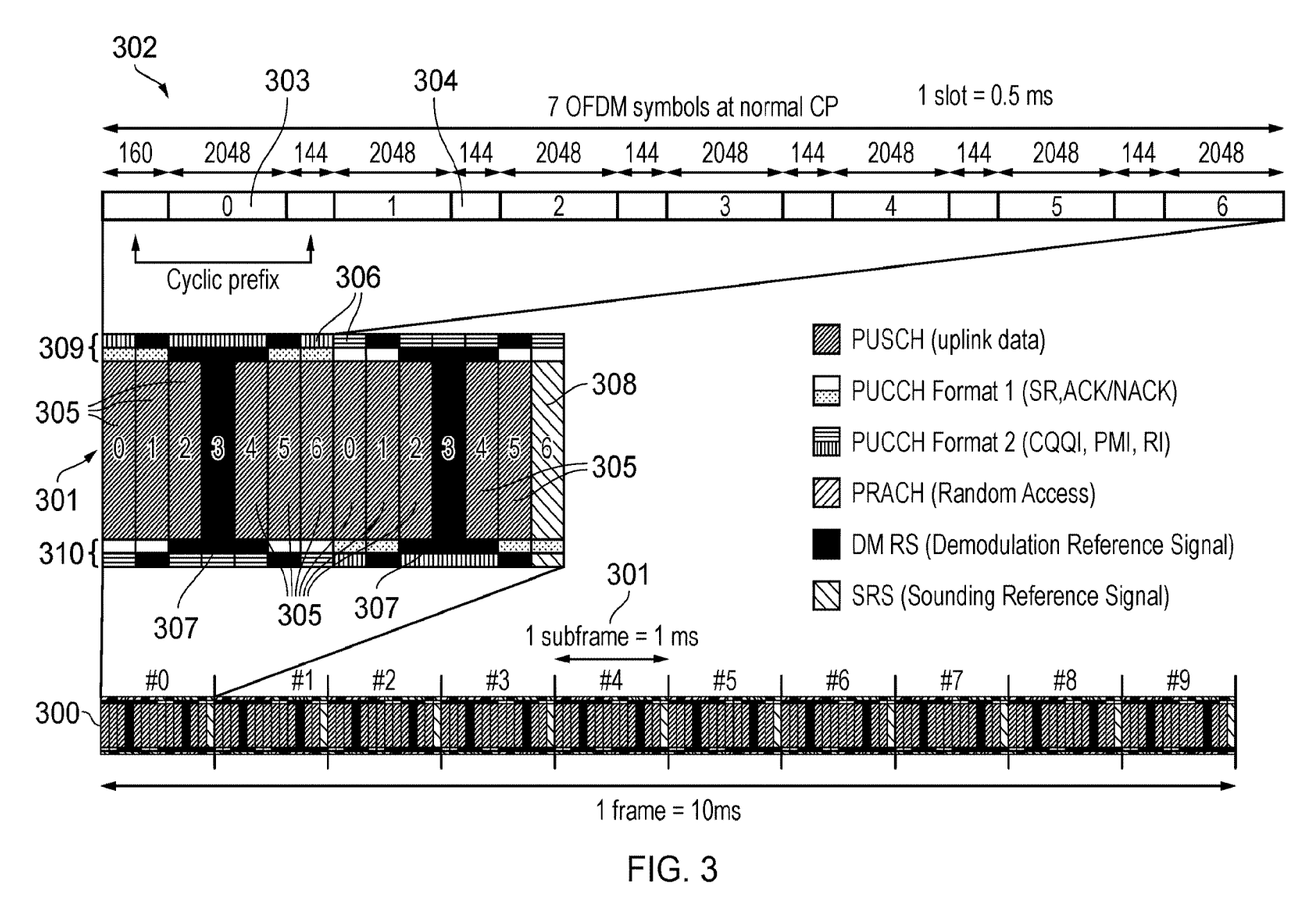
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to ten subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
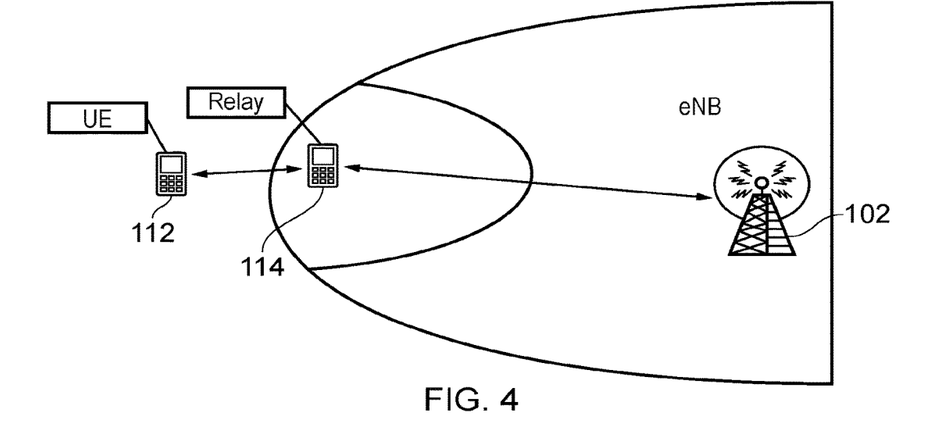
FIG. 4 provides a schematic diagram of a mobile communications system in which an out-of-coverage UE communicates with an eNB via a relay node.
Figure 5:
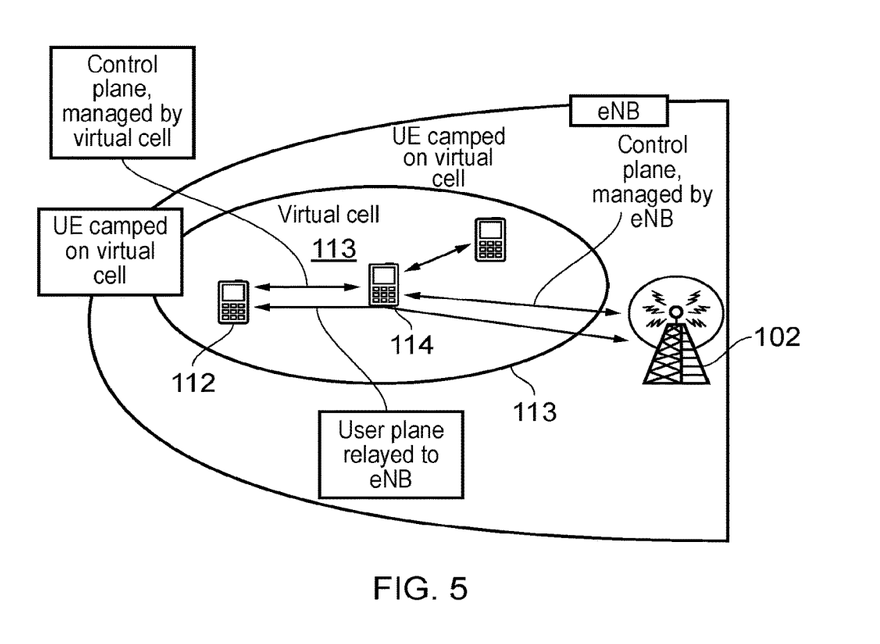
FIG. 5 provides a schematic diagram of a mobile communications system in which an in-coverage UE communicates with an eNB via a relay node.

As previously discussed, D2D communications may also allow a first UE to communicate with an eNB via a second UE (so that the second UE acts as a relay node). This allows coverage extension when the first UE is out of coverage of the base station, for example. Such a scenario is schematically illustrated in FIG. 4, in which a first UE 112 which is out of coverage of the eNB 102 is able to exchange signalling with the eNB 102 via a second UE 114 which is within coverage of the eNB 102. Here, the second UE 114 acts as a relay node. Alternatively, the first UE may be within coverage of the eNB, but may nonetheless communicate with the eNB via the second UE. Such a scenario is schematically illustrated in FIG. 5, in which the first UE 112 which is within coverage of the eNB 102 nonetheless exchanges signalling with the eNB 102 via the second UE 114. Here, the second UE 114 again acts as a relay node and forms a virtual cell 113. Such a technique allows a network capacity increase for UEs in coverage of the eNB 102. In one example, the UE virtual cell 113 maintains a single control plane connection to the eNB 102, and is granted the right to manage the UEs which are connected to it (including UE 112) as an eNB would (for example, control of mobility, resource allocation, etc.). In other words the control plane from the UEs camped on the virtual cell 113 (that is, the UEs connected to the virtual cell 113) is terminated at the virtual cell, while the virtual cell has a separate control plane with the eNB 102. The user-plane is relayed to the eNB 102.

Figure 6:
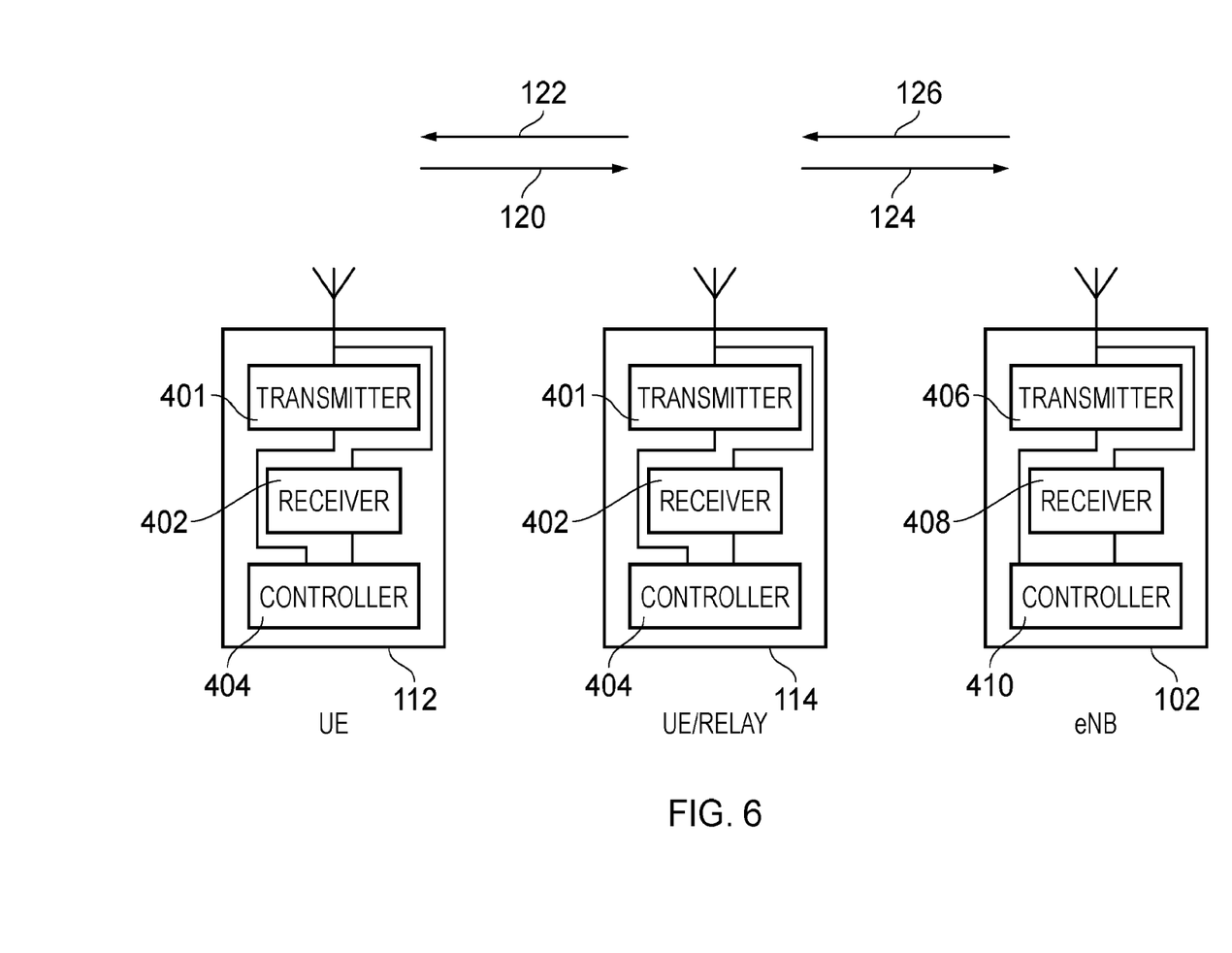
FIG. 6 schematically illustrates communications between a first UE and an eNB via a second UE, the second UE acting as a relay node.

FIG. 6 shows a schematic block diagram of a communications path between the first UE 112 and the base station 102 via the second UE 114 acting as a relay node (as may occur in the arrangements shown in FIGS. 5 and 6, for example). As shown in FIG. 6, the first UE 112 includes a transmitter 401, a receiver 402 and a controller 404 to control the transmission and reception of signals to the second UE 114 acting as a relay node. The up-link signals are represented by an arrow 120 and the downlink signals are shown by an arrow 122. The second UE 114 could be a conventional UE and so includes also a transmitter 401 receiver 402 and a controller 404. The second UE 114 operates in accordance with a conventional arrangement but transmits signals on the uplink as shown by an arrow 124 and receives signals on the downlink as represented by an arrow 126 so as to transmit signals to and receive signals from the base station 102, respectively. The base station 102 includes a transmitter 404 a receiver 408 and a controller 410 which may include a scheduler for scheduling the transmission and reception of signals on the downlink and the uplink in accordance with the wireless access interface used.

It is noted that, in examples of the present disclosure, each UE includes a transmitter, receiver and controller (as shown for UEs 112 and 114 in FIG. 6) and each base station includes a transmitter, receiver and controller (as shown for base station 102 in FIG. 6) so as to allow communication and signalling (including beacon signalling) between the UEs and/or base stations. In particular, each UE comprises a transmitter 401 for transmission of wireless signals, a receiver 402 for reception of wireless signals and a controller 404 configured to control the operation of the UE in accordance with examples of the disclosure. The controller may comprise a processor unit which is suitably configured/programmed to provide the desired functionality described herein using conventional programming/configuration techniques for equipment in wireless telecommunications systems. For each UE, the transmitter 401, receiver 402 and controller 404 are schematically shown in FIG. 6 as separate elements for ease of representation. However, it will be appreciated that for each UE the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the UEs 112, 114 will in general comprise various other elements associated with their operating functionality in accordance with established wireless telecommunications techniques (e.g. a power source, possibly a user interface, and so forth).

Figure 7:
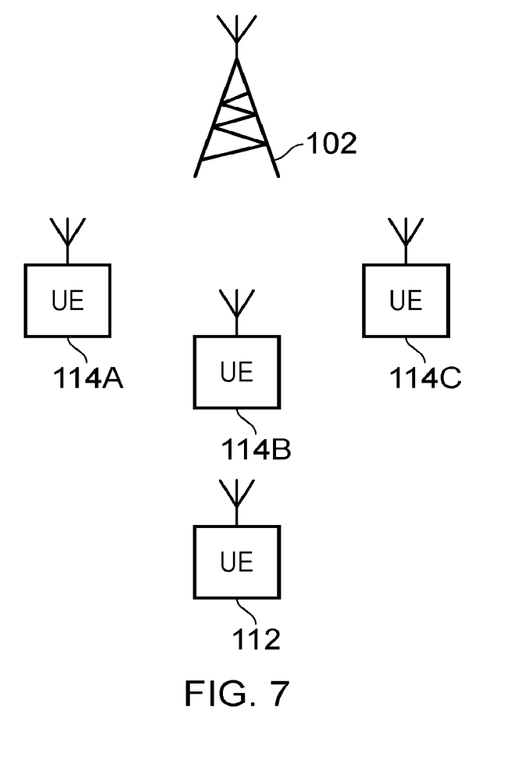
FIG. 7 provides a schematic diagram of a mobile communications system in which one of a plurality of relay nodes is selectable by a UE for performing communication with an eNB.

When presented with the scenarios of both FIG. 4 and FIG. 5, the present disclosure aims to help manage mobility of the UE 112. In particular, the present disclosure aims to help manage selection and/or reselection of an appropriate relay node 114 when there is a plurality of potential relay nodes which may be used by a first UE 112 to perform communication with a base station. Such a scenario is schematically illustrated in FIG. 7. Here, there are three UEs 114A, 114B and 114C, each of which is potentially able to act as a relay node so as to relay signalling between the base station 102 and first UE 112. It is often the case that the UE 112 will initially select a first one of the UEs 114A-C to act as a relay node, but will then, at a later time, need to select a different one of the UEs 114A-C to act as a relay node and to thus perform a reselection operation. Such reselection operations are generally to take into account, for example, mobility of the UE 112 and/or one or more of the UEs 114A-C.

It has been suggested that, in order to perform such a reselection operation, the UE 112 may periodically perform measurement of a signal characteristic of a signal transmitted by each of the UEs 114A-C and, at any one time, select the one of the UEs 114A-C with the best measured signal characteristic. The measured signal characteristic could be signal quality or signal strength, for example, and thus the UE 112 might select, at one time, the one of the UEs 114A-C with the highest measured signal quality or signal strength (that is, the highest rank UE 114A-C). As a more particular example, the measured signal characteristic may be the ProSe Communication 5 (PC5) Device-to-Device (D2D) Reference Signal Received Power (RSRP) of each of the UEs 114A-C. This may also be referred to as the PC5 link quality. Such periodic measurement of signals from different sources, however, requires relatively high complexity of the UE 112 and results in high power consumption. This is undesirable, especially for a UE 112 which is intended to be a low cost, simple device (such as an LC-MTC device).

Examples of the present disclosure thus provide an alternative solution, in which a threshold (also referred to as a reselection threshold) for a measured signal characteristic of a signal transmitted by the currently selected relay UE 114A-C is defined. Only once the measured signal characteristic goes below this threshold for the currently selected relay UE does the remote UE 112 then perform measurements of the signal characteristic of signals transmitted by the other relays and a relay selection/reselection process.

The signal characteristic of the relay UE(s) which is measured (including the signal characteristic of signals transmitted by a currently selected relay UE and the signal characteristic of discovery signals transmitted by potential relay UEs—see below) may be the PC5 link quality (as defined above). However, it will be appreciated that any other suitable signal characteristic (indicative of signal strength or signal quality, for example) could also be used. The following examples refer to the PC5 link quality as the measured signal characteristic. However, it will be appreciated that the general principle of the examples could be used with any measured signal characteristic, and that, in such a case, the measurement of the PC5 link quality will instead be a measurement of the chosen signal characteristic.

With examples of the present disclosure, after the remote UE 112 selects/connects to one of the relay UEs 114A-C, the UE 112 does not reselect or select another relay UE until the measured PC5 link quality of the current relay UE goes below the threshold, even if there is another relay which is ranked better.

In an example, the threshold is higher than the "suitable" criteria for selection, this suitable criteria (also referred to as a suitable threshold or suitability threshold) being the value of the PC5 link quality at which the controller 404 of the UE 112 determines that at least one of the transmitter 401 and receiver 402 of the UE 112 cannot exchange signalling with the currently selected relay UE (or at least cannot exchange signalling with the currently selected relay UE satisfactorily). This allows the UE 112 to enable measurements and perform a reselection/selection before completely losing the original relay UE (as occurs when the PC5 link quality goes below the suitable threshold and the UE 112 disconnects form the original relay UE). In an alternative example, however, the threshold for initiating reselection may be the same as the suitable threshold. In both examples, however, it is noted that the UE 112 "sticks" to the current relay UE as long as possible (depending on the reselection threshold). This reduces how often reselection of relay UEs occurs, thus reducing the potential service interruption that may occur during relay reselection. This has particular application to the scenario of FIG. 5 (in which the relay UE 114 has control over the resources allocated to the UE 112), because the resources used by relay UEs in the same cell are co-ordinated and do not interfere with each other. This lack of interference means that frequent reselection to the highest ranked relay UE 114 (for example), and thus that reselection is only required when a relay UE becomes or looks to shortly become no longer suitable.

Because measurements are initiated on the other relay UEs only once the PC5 link quality of the currently selected relay UE 114 goes below the reselection threshold, power consumption by the relay UE 112 is reduced. This is because the remote UE 112 does not have to perform such measurements while the current relay UE is measured to be above the reselection threshold. In addition, when the reselection threshold is greater than the suitable threshold, measurements are initiated in good time so as to enable the UE 112 to detect and select a new relay UE before the current relay UE becomes unusable.

To be clear, with the present technique, if the measured signal characteristic from a first, current relay node becomes less than the reselection threshold, then the controller 404 of the UE 112 performs a procedure for allowing selection of a second, new relay node. In one example, the procedure for allowing selection of the second relay node comprises performing measurements of a signal characteristic of a discovery signal transmitted by each relay node 114A-C in the plurality of relay nodes and received at the receiver 402 of the UE 112. On the basis of the performed measurements, the controller then selects a second relay node and controls the transmitter 401 and receiver 402 of the relay UE 112 to exchange signals with the base station 102 via the selected second relay node. The characteristic of each discovery signal measured by the UE 112 may be the PC5 link quality of each discovery signal, for example, and the UE 112 may select the relay node with the highest PC5 link quality as the second relay node. The discovery signal transmitted by each relay node 114A-C may be transmitted periodically. Alternatively, upon detecting that the measured signal characteristic of the first relay node has become less than the reselection threshold, the controller 401 of the UE 112 may control the transmitter 401 to transmit a discovery signal initiation message to each of the relay nodes 114A-C, the discovery signal initiation message instructing each relay node to transmit the discovery signalling.

It is noted that, using conventional reselection between cells on the same frequency, the UE 112 performs measurements and ranks each cell in order of a measured signal characteristic (such as quality, for example). If one cell becomes ranked higher than the current cell, and as long as the higher ranked cell is suitable (using similar criteria to above) the UE 112 performs reselection. This is generally necessary in the context of reselection between LTE cells on the same frequency. This is because, since the cells will interfere with each other, the UE should always select the best quality cell (with adjustment for uplink/downlink imbalance using offset).

However, in the context of relay UEs in LTE Release 13, the resources are always controlled by an eNB (in most cases the same eNB, but even in the case that the relay is controlled by a neighbouring eNB, it is likely that there will be some co-ordination of resource usage). With this co-ordination, the possibility of interference becomes less of an issue, since different resources will be used at any point in time and therefore it becomes less critical to always select the best quality relay as quickly as possible. Examples of the present disclosure thus utilise these observations so as to provide a relay UE reselection technique, as has been described. In particular, the relay reselection technique of the present disclosure helps reduce power consumption of the UE 112 and reduces the risk of service disruption (since, in general, relay reselection is likely to occur less often). It is noted that, unless there can be a seamless change of relay, there is some potential service interruption associated with switching relays. This seamless change is not currently possible due to the current agreements in LTE RAN2 regarding how the UE selects and associates with a relay. The present disclosure thus provides an alternative solution to reduce the risk of service interruption.

The reselection threshold may be defined relative to the suitability threshold (either a fixed number of dB above the suitability threshold—for example 3 dB—or a network signalled relative threshold) or as an absolute threshold specified by the network. This would be set by the eNB 102 either in broadcast signalling or in dedicated signalling, or in case the remote UE 112 is out of coverage, the reselection threshold would have to be either preconfigured in the UE 112 or sent by the relay UE 114A-C itself via the PC5 interface (for example, broadcast in the "Master Information Block-sl" on the SL-BCH channel).

As previously mentioned, the remote UE 112 may also choose to save power by not performing measurements of other relay signals while the current relay PC5 link quality is above the reselection threshold. Once the PC5 link quality goes below the reselection threshold, measurements of the other relay signals are initiated.

Once the current relay link quality goes below the threshold, there are several options on how to perform reselection. For example:

1—The reselection can be completely up to the UE implementation of the UE 112, as long as the newly selected relay UE 114A-C is suitable;
2—The UE 112 may select the highest ranked relay UE 114A-C; or
3—The UE 112 may use predetermined reselection evaluation criteria including conditions for the current and target relay (for example, with offset, hysteresis, threshold and Treselection similar to today's cell reselection criteria).

Regardless of how the ranking and reselection evaluation is performed, this shall not be performed until the current relay link quality is below the predetermined reselection threshold.

In addition to reselection thresholds and ranking, it is possible that different relays are associated with a reselection priority (for example as set out in the applicant's European patent application EP 15167882.8). The described technique of the present disclosure can still be applied, as long as the serving relay is always assigned the highest priority (that is, regardless of relay selection or reselection priority). In other words, once the remote UE 112 selects and associates with a relay UE 114A-C, that selected relay UE becomes the highest priority. The selected relay UE will then remain as the highest priority until the link quality goes below the reselection threshold.

Figure 8:
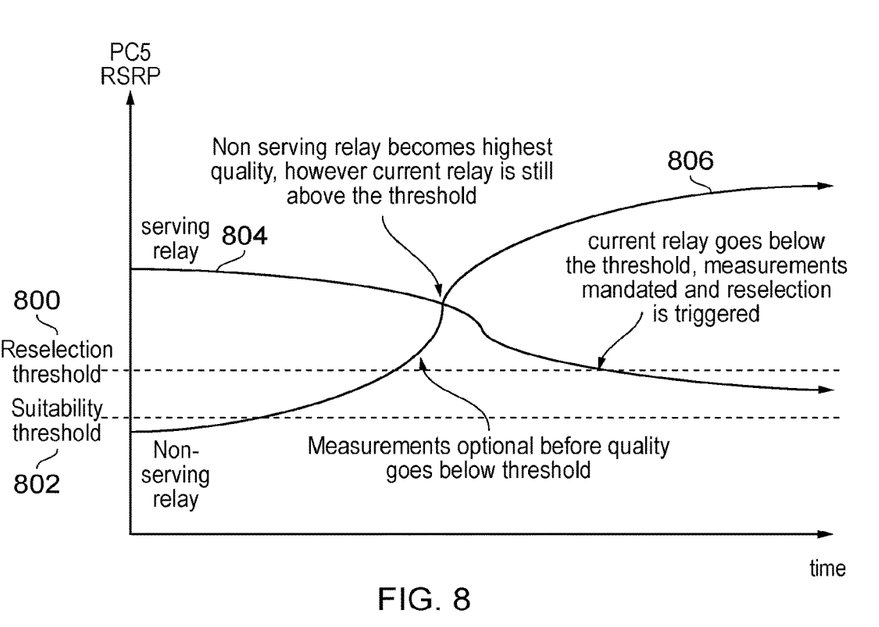
FIG. 8 provides a graph illustrating a relay reselection method according to an example of the present disclosure.

FIG. 8 is a graph showing an example implementation of the present disclosure. The graph shows the level of the reselection threshold 800 and the level of the suitability threshold 802. The graph also shows how the PC5 RSRP of the current, serving relay UE (indicated by line 804) and the PC5 RSRP of another, non serving relay UE (indicated by line 806) vary over time. It is seen that even when the RSRP of the current serving relay UE goes below that of the other, non-serving relay UE, relay reselection is not performed. Rather, relay reselection is only initiated when the RSRP of the current serving relay UE falls below the reselection threshold, as has been described.

Various features of the present technique are defined by the following numbered clauses:

1. A terminal device for use with a wireless telecommunications system comprising a base station and a plurality of relay nodes, the terminal device comprising:
    a transmitter;
    a receiver; and
    a controller operable to:
    select a first relay node from the plurality of relay nodes and control the transmitter and receiver to exchange signals with the base station via the first relay node;
    measure a signal characteristic associated with the first relay node and compare the measured signal characteristic with a predetermined threshold value;
    if the measured signal characteristic is greater than the predetermined threshold value, control the transmitter and receiver to continue to exchange signals with the base station via the first relay node; and
    if the measured signal characteristic is less than the predetermined threshold value, perform a procedure for allowing selection of a second relay node from the plurality of relay nodes via which the transmitter and receiver may exchange signals with the base station.

2. A terminal device according to clause 1, wherein the procedure for allowing selection of a second relay node from the plurality of relay nodes comprises performing measurements of a characteristic of a discovery signal transmitted by each relay node in the plurality of relay nodes and received at the receiver.

3. A terminal device according to clause 2, wherein the discovery signal is transmitted periodically by each relay node in the plurality of relay nodes.

4. A terminal device according to clause 2, wherein, when the measured signal characteristic associated with the first relay node is determined to be less than the predetermined threshold value, the controller is operable to control the transmitter to transmit a discovery signal initiation message to each of the relay nodes in the plurality of relay nodes, the discovery signal initiation message instructing each relay node in the plurality of relay nodes to transmit the discovery signal.

5. A terminal device according to any one of clauses 2 to 4, wherein, on the basis of the performed measurements, the controller is operable to select a second relay node and to control the transmitter and receiver to exchange signals with the base station via the selected second relay node.

6. A terminal device according to any preceding clause, wherein the predetermined threshold value is greater than a suitable threshold value, the suitable threshold value being a value of the signal characteristic associated with the first relay node below which the controller determines that at least one of the transmitter and receiver cannot exchange signals with the first relay node.

7. A terminal device according to clause 6, wherein the predetermined threshold value is greater than the suitable threshold value by a predetermined amount.

8. A terminal device according to clause 7, wherein the receiver is operable to receive the predetermined amount by which the predetermined threshold value is greater than the suitable threshold value from one of the base station or first relay node.

9. A terminal device according to any one of clauses 1 to 6, wherein the receiver is operable to receive the predetermined threshold value from one of the base station or first relay node.

10. A terminal device according to any preceding clause, wherein the measured signal characteristic associated with the first relay node is a ProSe Communication 5 (PC5) Device-to-Device (D2D) Reference Signal Received Power (RSRP).

11. A terminal device according to any one of clauses 2 to 5, wherein the measured signal characteristic of the discovery signal transmitted by each relay node in the plurality of relay nodes is a ProSe Communication 5 (PC5) Device-to-Device (D2D) Reference Signal Received Power (RSRP).

12. A wireless telecommunications system comprising a base station, a plurality of relay nodes and a terminal device according to any preceding clause.

13. A method of operating a terminal device for use with a wireless telecommunications system comprising a base station and a plurality of relay nodes, the terminal device comprising a transmitter and a receiver, the method comprising:
selecting a first relay node from the plurality of relay nodes and controlling the transmitter and receiver to exchange signals with the base station via the first relay node;
measuring a signal characteristic associated with the first relay node and comparing the measured signal characteristic with a predetermined threshold value;
if the measured signal characteristic is greater than the predetermined threshold value, controlling the transmitter and receiver to continue to exchange signals with the base station via the first relay node; and
if the measured signal characteristic is less than the predetermined threshold value, performing a procedure for allowing selection of a second relay node from the plurality of relay nodes via which the transmitter and receiver may exchange signals with the base station.

14. A storage medium storing a computer program for controlling a computer to perform a method according to clause 13.

15. A terminal device for use with a wireless telecommunications system comprising a base station and a plurality of relay nodes, the terminal device comprising:
transmitter circuitry;
receiver circuitry; and
controller circuitry operable to:
select a first relay node from the plurality of relay nodes and control the transmitter circuitry and receiver circuitry to exchange signals with the base station via the first relay node;
measure a signal characteristic associated with the first relay node and compare the measured signal characteristic with a predetermined threshold value;
if the measured signal characteristic is greater than the predetermined threshold value, control the transmitter circuitry and receiver circuitry to continue to exchange signals with the base station via the first relay node; and
if the measured signal characteristic is less than the predetermined threshold value, perform a procedure for allowing selection of a second relay node from the plurality of relay nodes via which the transmitter circuitry and receiver circuitry may exchange signals with the base station.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

REFERENCES

[1] 3GPP TR36.872 V12.1.0, "Small cell enhancements for E-UTRA and E-UTRAN—Physical Layer aspects", December 2013.
[2] LTE for UMTS: OFDMA and SC-FDMA Based Radio Access, Harris Holma and Antti Toskala, Wiley 2009, ISBN 978-0-470-99401-6.

The invention claimed is:

1. A terminal device for use with a wireless telecommunications system comprising a base station and a plurality of relay nodes, the terminal device comprising:
a transmitter;
a receiver; and
circuitry configured to
select a first relay node from the plurality of relay nodes and control the transmitter and receiver to exchange signals with the base station via the first relay node;
measure a signal characteristic associated with the first relay node and compare the measured signal characteristic with a predetermined threshold value;
control the transmitter and receiver to continue to exchange signals with the base station via the first relay node in a case that the measured signal characteristic is greater than the predetermined threshold value; and
perform a procedure for selecting a second relay node from the plurality of relay nodes via which the transmitter and receiver may exchange signals with the base station in a case that the measured signal characteristic is less than the predetermined threshold value, wherein
the procedure for selecting the second relay node includes performing measurements of a characteristic of a discovery signal received from each of the plurality of relay nodes at the receiver, and
the circuitry is configured to control the transmitter to transmit a discovery signal initiation message to each of the plurality of relay nodes instructing each of the plurality of relay nodes to transmit the discovery signal in the case that the measured signal characteristic associated with the first relay node is determined to be less than the predetermined threshold value.

2. The terminal device of claim 1, wherein
the discovery signal is transmitted periodically by each of the plurality of relay nodes.

3. The terminal device of claim 1, wherein
the circuitry is configured to select a second relay node and control the transmitter and receiver to exchange signals with the base station via the selected second relay node based on the measurements.

4. The terminal device of claim 1, wherein
the predetermined threshold value is greater than a first value of a signal characteristic associated with the first relay node below which the circuitry determines that at least one of the transmitter and receiver cannot exchange signals with the first relay node.

5. The terminal device of claim 4, wherein
the predetermined threshold value is greater than the first value by a predetermined amount.

6. The terminal device of claim 4, wherein
the receiver is configured to receive the predetermined amount by which the predetermined threshold value is greater than the first threshold value from one of the base station or first relay node.

7. The terminal device of claim 1, wherein
the receiver is configured to receive the predetermined threshold value from one of the base station or first relay node.

8. The terminal device of claim 1, wherein
the measured signal characteristic associated with the first relay node is a ProSe Communication 5 (PC5) Device-to-Device (D2D) Reference Signal Received Power (RSRP).

9. The terminal device of claim 1, wherein
the measured signal characteristic of the discovery signal transmitted by each of the plurality of relay nodes is a ProSe Communication 5 (PC5) Device-to-Device (D2D) Reference Signal Received Power (RSRP).

10. The terminal device of claim 1, wherein
at least one of the plurality of relay nodes is another terminal device.

11. A method of operating a terminal device for use with a wireless telecommunications system comprising a base station and a plurality of relay nodes, the terminal device comprising a transmitter and a receiver, the method comprising:
   selecting a first relay node from the plurality of relay nodes and controlling the transmitter and receiver to exchange signals with the base station via the first relay node;
   measuring a signal characteristic associated with the first relay node and comparing the measured signal characteristic with a predetermined threshold value;
   controlling the transmitter and receiver to continue to exchange signals with the base station via the first relay node in a case that the measured signal characteristic is greater than the predetermined threshold value;
   performing a procedure to select a second relay node from the plurality of relay nodes via which the transmitter and receiver may exchange signals with the base station in a case that the measured signal characteristic is less than the predetermined threshold value, wherein performing the procedure to select the second relay node includes performing measurements of a characteristic of a discovery signal received from each of the plurality of relay nodes at the receiver, and
   controlling the transmitter to transmit a discovery signal initiation message to each of the plurality of relay nodes in the case that the measured signal characteristic associated with the first relay node is determined to be less than the predetermined threshold value, the discovery signal initiation message instructing each of the plurality of relay nodes to transmit the discovery signal.

12. The method of claim 11, wherein
the discovery signal is transmitted periodically by each of the plurality of relay nodes.

13. The method of claim 11, wherein
the measured signal characteristic associated with the first relay node is a ProSe Communication 5 (PC5) Device-to-Device (D2D) Reference Signal Received Power (RSRP).

14. The method of claim 11, wherein
the measured signal characteristic of the discovery signal transmitted by each of the plurality of relay nodes is a ProSe Communication 5 (PC5) Device-to-Device (D2D) Reference Signal Received Power (RSRP).

15. A user equipment (UE) for use with a wireless telecommunications system comprising a base station and a plurality of other UEs, the terminal device comprising:
   a transmitter;
   a receiver; and
   circuitry configured to
      select a first UE from the plurality of other UEs and control the transmitter and receiver to exchange signals with the base station via the first UE;
      measure a ProSe Communication 5 (PC5) Device-to-Device (D2D) Reference Signal Received Power (RSRP) associated with the first UE and compare the measured PC5 D2D RSPS with a predetermined threshold value;
      control the transmitter and receiver to continue to exchange signals with the base station via the first UE in a case that the measured PC5 D2D RSPS is greater than the predetermined threshold value; and
      perform a procedure for selecting a second UE from the plurality of other UEs via which the transmitter and receiver may exchange signals with the base station in a case that the measured PC5 D2D RSPS is less than the predetermined threshold value, wherein
   the procedure for selecting the second UE includes performing measurements of PC5 D2D RSPS of a discovery signal received from each of the plurality of other UEs at the receiver, and
   the circuitry is configured to control the transmitter to transmit a discovery signal initiation message to each of the plurality of other UEs instructing each of the plurality of other UEs to transmit the discovery signal in the case that the measured PC5 D2D RSPS associated with the first UE is determined to be less than the predetermined threshold value.

* * * * *